United States Patent [19]

Voumard

[11] 3,942,848

[45] Mar. 9, 1976

[54] SHOCK ABSORBING PIVOT BEARING FOR ROTARY WATCH PARTS

[75] Inventor: François Voumard, Le Locle, Switzerland

[73] Assignee: Seitz S.A., Les Brenets, Switzerland

[22] Filed: Apr. 8, 1974

[21] Appl. No.: 459,025

[30] Foreign Application Priority Data

Apr. 6, 1973 Switzerland ........................ 4956/73

[52] U.S. Cl. ................................ 308/159; 58/140 A
[51] Int. Cl.[2] ...................... F16C 17/08; F16C 27/08
[58] Field of Search ........... 308/159, 158; 58/140 A

[56] References Cited

UNITED STATES PATENTS

| | | | |
|---|---|---|---|
| 2,300,362 | 10/1942 | Shotter | 308/159 |
| 3,050,350 | 8/1962 | Loretan | 308/159 |
| 3,747,325 | 7/1973 | Schneider | 308/159 X |
| 3,758,178 | 9/1973 | Meylan-Rochat | 308/159 |
| 3,790,237 | 2/1974 | Quaile et al. | 308/159 |

*Primary Examiner*—Robert J. Spar
*Assistant Examiner*—Randolph A. Reese
*Attorney, Agent, or Firm*—Stevens, Davis, Miller & Mosher

[57] ABSTRACT

The pivot 28 is journalled in a bearing member 38 molded in one piece with a resilient web 39 fixed at its periphery to a body member 41 by a hard metal ring 42. Due to the resilience of web 39, member 38 may be shifted into member 41 and tilt about a diameter of its edge connected to web 39, thus protecting pivot 28 against impacts occuring in any direction. Ring 42 constitutes abutting means which limit the amplitude of the displacements of shaft 1 under the action of impacts.

10 Claims, 9 Drawing Figures

SHOCK ABSORBING PIVOT BEARING FOR ROTARY WATCH PARTS

BACKGROUND OF THE INVENTION

1. Field of the Invention

This invention relates to the shock absorbing bearings for rotary watch parts, especially the balance-wheel, and more particularly to the bearings in which each one of the two pivots formed at the ends of a shaft is held by a bearing member being movable within a fixed body member under the control of resilient means provided between the movable bearing member and the fixed body member and arranged so as to hold normally the movable bearing member at rest in a centered position within the fixed body member.

2. The Prior Art

The known bearings of that type are not easy to manufacture. Their cost is accordingly relatively high. In order to hold the two pivots of the shaft of a rotary watch part the known bearings do not comprise less than eight pieces. Even with pieces having shapes enabling machining them automatically, mounting the bearing remains an operation which requires the permanent assistance of a worker. A fully automatic mounting operation would, indeed, require means to orient every piece of the bearing in the right manner. Moreover, the costs of the known bearings of the type considered are too high for cheap watches. Since a broken pivot, in particular that of the balance-wheel, disables the watch, the carrier of a cheap watch is thus paradoxically compelled to handle his watch with more care than an expensive watch in order to keep it running even if the rate of his watch is not very precise.

SUMMARY OF THE INVENTION

It is therefore an object of the invention to provide a shock absorbing bearing the costs of which are in harmony with those of the cheap watches. The shock absorbing bearing according to the invention also has to ensure a satisfactory pivot protection especially in view of the little care with which such watches are usually treated.

A more particular object of the invention is to provide a bearing with a movable member composed of a cap portion supporting the pivot and of a wall portion extending around the pivot from a first circular edge connected to the cap portion to a second circular edge located opposite a relatively strong shaft portion adjacent to the pivot, and with resilient means in the form of a web connecting the edge of said wall portion being far from said cap portion to the body member said web being yieldable out of its plane thus permitting the movable member to move in a direction perpendicular to the web and to tilt about a diameter of the wall portion edge connected to the web.

BRIEF DESCRIPTION OF THE DRAWINGS

Six embodiments of the pivot bearing according to the invention are represented diagrammatically and by way of example in the accompanying drawings in which.

DESCRIPTION OF THE PREFERRED EMBODIMENTS.

Figure 1:
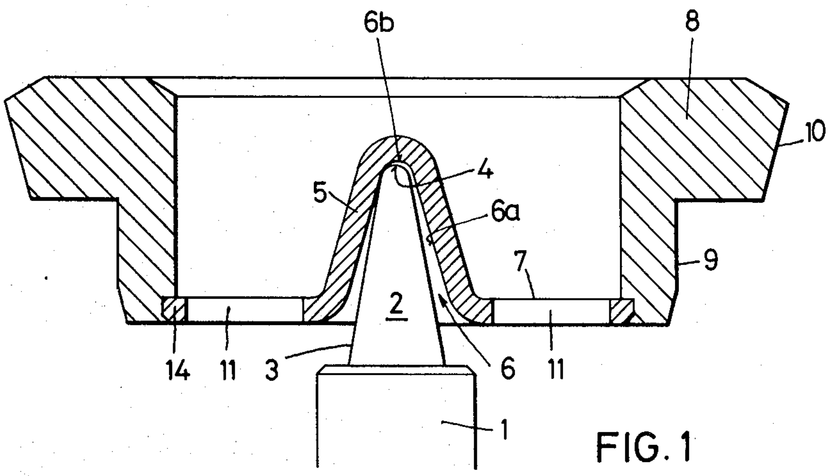
FIG. 1 is a sectional view of the first embodiment being in normal working position.
Figure 2:
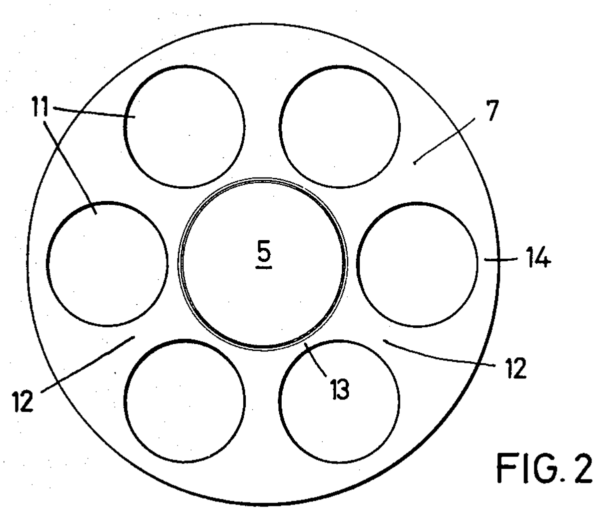
FIG. 2 is a plan view of one piece of the bearing of FIG. 1.
Figure 3:
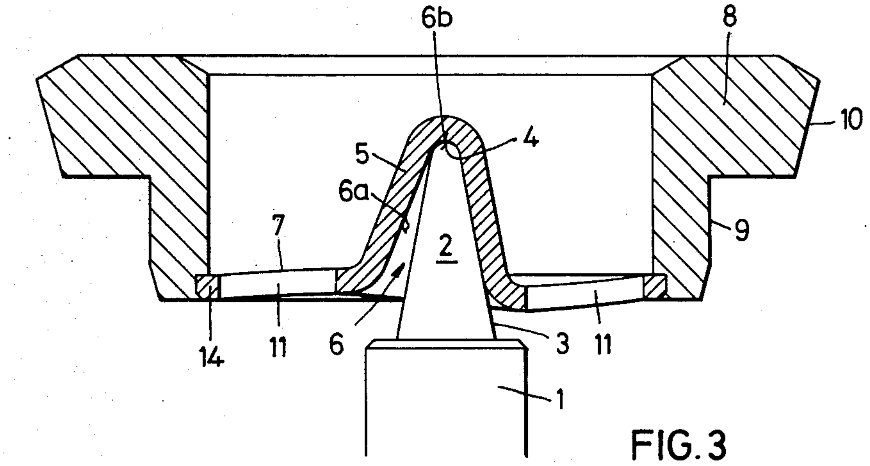
FIG. 3 is a sectional view similar to that of FIG. 1, the movable bearing member having been urged into an extreme remote position by an impact.

FIGS. 1 to 3 show a shock absorbing bearings for the upper pivot of a balance-wheel shaft 1, this bearing being carried in the usual manner by a cock (not shown). A pivot 2 is formed at each end of shaft 1. Each pivot 2 is directly connected to shaft 1. It comprises a conical side surface 3 and a spherical tip surface 4 tangent to surface 3.

With respect to the usual cylindrical pivots formed at the ends of the conventional balance-wheel shafts, the sizes of pivot 2 are chosen in such a manner that surface 4 has at least approximately the same diameter as said cylindrical pivots. As regards the conical surface 3 its apex angle is preferably between 10° and 40°.

Each pivot 2 enters a space of a member 5 delimited by an inner surface 6 of this member. Surface 6 has a shape similar to that of pivot 2; it comprises a conical section 6*a* formed on a wall portion of member 5 and a spherical section 6*b* tangent to section 6*a* and formed on a cap portion of member 5. The section 6*b* of the inner surface 6 has a diameter slightly larger than that of the pivot tip surface 4. Section 6*b* can, for instance, be given the same diameter as would have the hole of a pierced jewel which would be provided for journalling a conventional cylindrical pivot formed at the end of a conventional balance-wheel shaft. The conical section 6*a* has an apex angle preferably 5° to 20° larger than that of the pivot side surface 3.

Member 5 is made in one piece with a circular web 7 set in a body member 8. This body member 8 has the outer shape of a usual end-piece. It comprises a cylindrical surface 9 arranged for being set with force fit into a hole of a cock (not shown) and a truncated-conical portion 10 on which a regulator (not shown) may be mounted for rotary motion. Web 7 normally holds member 5 in the centered position represented in FIG. 1 within body member 8. Member 5 is, however, not rigidly held in that position because web 7 is resilient. As shown in FIG. 2 web 7 is provided for that purpose with a row of cut-outs 11 which are regularly staggered around the bearing axis. Cut-outs 11 only leave narrow radial arms 12 between them, which extend from a continuous annular portion 13 connected to member 5 to a continuous peripheral portion 14 secured to member 8. The resilient arms 12 will thus permit the portion 13 to move with respect to the fixed portion 14 in a direction perpendicular to the plane thereof. This will occur, for instance, in the case of an axial impact. Portion 13 will then slightly be shifted inwards with respect to member 8. A transverse displacement of portion 13 with respect to portion 14 can hardly take place. This does, however, not prevent the bearing from protecting pivot 2 also in the case of a radial impact.

To understand the operation of the bearing in such an event, it should be noted that due to the shape described both of pivot 2 and of the inner surface 6 of member 5, the pivot 2 does, normally, only come in contact with that surface at one point. If shaft 1 rests in a vertical position, the vertex of the tip surface 4 of its lower pivot will lay on the center point of the spherical surface 6b of the movable member of the lower bearing, any further contact between the outer surface of the lower pivot and the inner surface of the corresponding bearing member being excluded. The upper pivot of shaft 1 will itself have some free play within the corresponding bearing member. It will, however, come in contact with, at most, one point of surface 6 of this member at a time, said point being located in the vicinity of the transition circle between the surface portions 3 and 4. If, on the contrary, shaft 1 rests in a horizontal position, it will come in contact with two points of the surfaces 6 of the corresponding bearing members located in the vicinity of the transition circles between surfaces 3 and 4 of each one of its pivots. In whichever position shaft 1 may be, it will come in contact with the surfaces 6 of the corresponding bearing members only at two points each located on the spherical surfaces 4 of its pivots.

In the event of a radial impact, it is accordingly at these points of the two bearing members 5 that pivots 2 will act on the latter. The forces thus transmitted to the members 5 will cause the latter to tilt about a diameter of the edge of their wall portion which is connected to web 7. During that tilting motion the cap portion of each member 5 will move transversely within body member 8. The amplitude of that tilting motion is however limited. FIG. 3 shows indeed that the conical outer side surface of pivot 2 soon comes in contact along a generatrix with the surface 6 of member 5. FIG. 3 thus shows the outmost tilting position of member 5. Alhtough the latter cannot move beyond that position within member 8 under the effect of a radial impact, pivot 2 is sufficiently protected. The reaction of member 5 on pivot 2 occurs indeed at a point of the latter which is located in the vicinity of its base. At that place the pivot is, however, strong enough to support the impact without damage. It will be noted in the position of FIG. 3 that the delicate end of pivot 2, i.e., its tip portion, is only subjected to the reaction of member 5 due to the resilient deformation of web 7. In the event of an impact in an oblique direction one of the two members 5 supporting shaft 1 will yield into the corresponding body member 8 while tilting in the manner described hereabove.

Since the members 5 receiving pivots 2 of shaft 1 limit by themselves the transverse displacement of this shaft, the abutting means provided in the usual known bearings are here superfluous thus permitting a substantial simplification because these means notoriously require to be machined with precision.

Due to their shape pivots 2 do not risk to collapse in the event of an axial impact. Web. 7 can accordingly be made strong enough in order to limit by itself the displacements of shaft 1 in that direction by the sole effect of its elasticity without requiring the presence of rigid abutting means. In the first embodiment member 5 and web 7 can be metallic and consist of brass, beryllium-bronze, steel possibly coated by a galvanic layer SnNi or of any other antifrictional metal. They could also be made of plastics.

Due to the pivoting conditions of shaft 1 and in particular to the fact that its pivots 2 come in contact each one only at one point with surfaces 6, the friction will always be approximately the same whichever the position of shaft 1 may be relative to the gravitation field. With the bearing arrangement described the running variations of the watch between the horizontal and vertical positions will accordingly be smaller than with cylindrical pivots journalled in pierced jewels and cap jewels.

With the bearing according to the invention, only four pieces are required for pivoting shaft 1. These pieces have, however, simple shapes. Piece (5, 7) can be obtained by cutting and stamping. It can be set in body member 8 as part of a fully automatic operation by relatively simple means because piece (5, 7) need not be set in a particular angular position in member 8. With respect to the known bearings, the bearing according to the invention is substantially cheaper without having to make corresponding sacrifices with regard to the quality of its operation.

Figure 4:
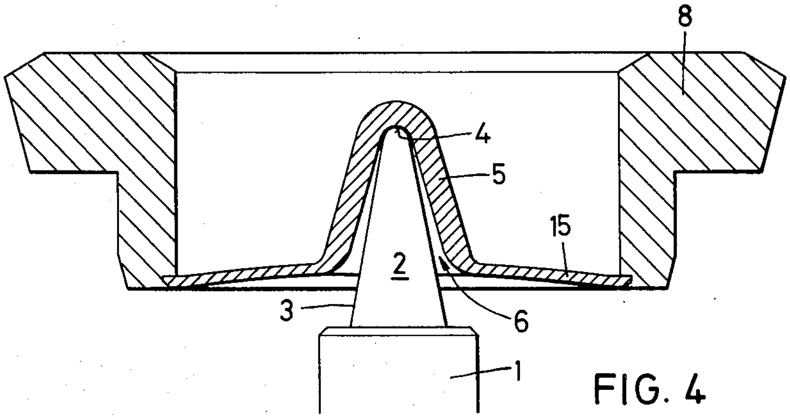
FIGS. 4 to 8 are sectional views similar to FIG. 1 showing every one of the five further embodiments.

Instead of rendering the web resilient by means of the cut-out of the first embodiment, it can also be made as shown by the second embodiment (FIG. 4). In this embodiment the bearing member 5 is made integral with a web 15 which is thinner than the wall portion of member 5.

Without increasing the number of pieces of the bearing, it would be possible to provide rigid abutting means for limiting the displacements of shaft 1 as with the known shock absorbing bearings. The third embodiment (FIG. 5) constitutes such an example in which the body member 16 has a cup shape. For that purpose, member 16 comprises a bottom portion 17 provided with a central opening 18, the outer surface of bottom portion 17 limiting the displacements in an axial direction of shaft 1 and the edge of opening 18 its transverse displacements.

In this embodiment the movable bearing member 19 receiving pivot 2 and web 20 are molded in one piece of plactics set in member 16.

The fourth embodiment (FIG. 6) shows a bearing arranged for receiving the lower pivot 2 of shaft 1. This bearing comprises a body member 21 which is to be set with force fit into a hole of the base plate of the watch movement. As with the preceding embodiments, this one also comprises a movable member 22 made in one piece with a web 23 connecting the movable member 22 to the body member 21. Piece (22, 23) can be molded in a synthetic material being soft comparatively to the embodiments without rigid abutting means. It is secured to body member 21 by means of a metallic ring 24 set in a lodging 25 of member 21 and pressing the periphery of piece (22, 23) against the bottom of lodging 25. As with the third embodiment the ring 24 and its central opening 26 constitute rigid abutting means limiting the axial and transverse displacements of shaft 1.

With the bearing according to the invention the use of conical pivots is not indispensable. The fifth embodiment (FIG. 7) shows the case of a usual shaft 1 comprising at each end a strong section 27 and a cylindrical pivot 28. Pivot 28 and section 27 extend within a bearing member 29 which is molded in one piece of plastics with a web 30. Member 29 has an inner surface 31 the shape of which corresponds to that of the end portion of shaft 1 entering member 29. Surface 31, however, comprises conical portions 32 and 33 the apex angles of which are chosen in such a manner that in the event of a radial impact pivot 28 will cause member 29 to tilt until section 27 butts against surface 33.

To ensure the desired operation the inner surface of bearing member 29 need simply have a form which differs from that of the outer surface of the shaft end entering this bearing member only the fact that it is a little more splayed. In the event of a radial impact the shaft end will lay along a line against the movable bearing member as soon as the gap between the inner surface of that bearing member and the outer surface of the shaft section entering that bearing member linearly increases from the pivot tip toward the opening of the bearing member.

Figure 7:
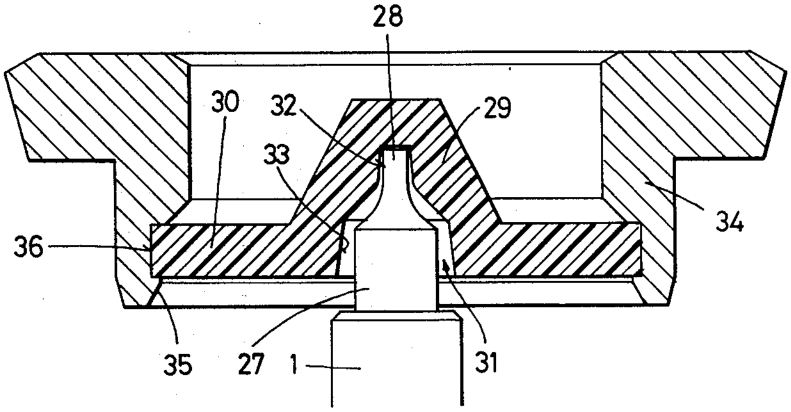

In the embodiment represented in the FIG. 7 piece (29, 30) is secured to body member 34 by snap fitting. For that purpose, body member 34 comprises a rim 35 which permits web 30 to be introduced into an annular recess 36 of member 34 by merely pressing this web 30 in an axial direction.

Figure 5:
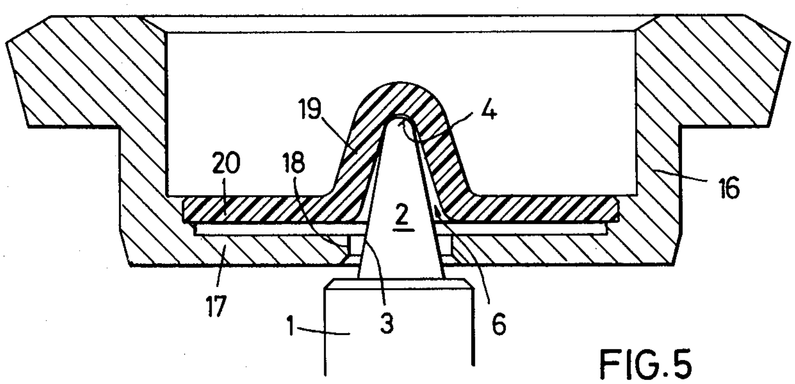
Figure 6:
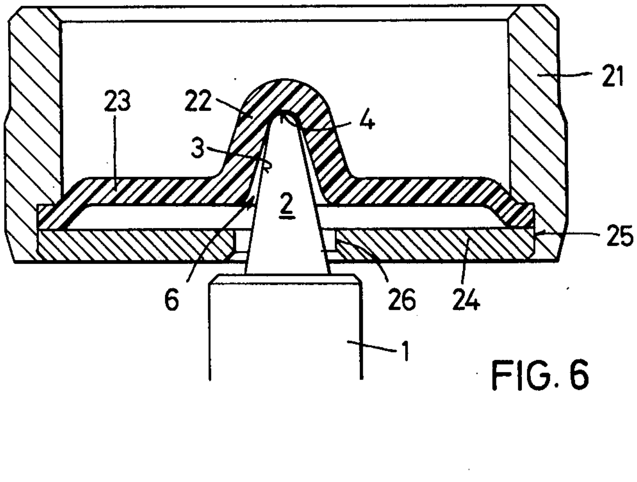
Figure 8:
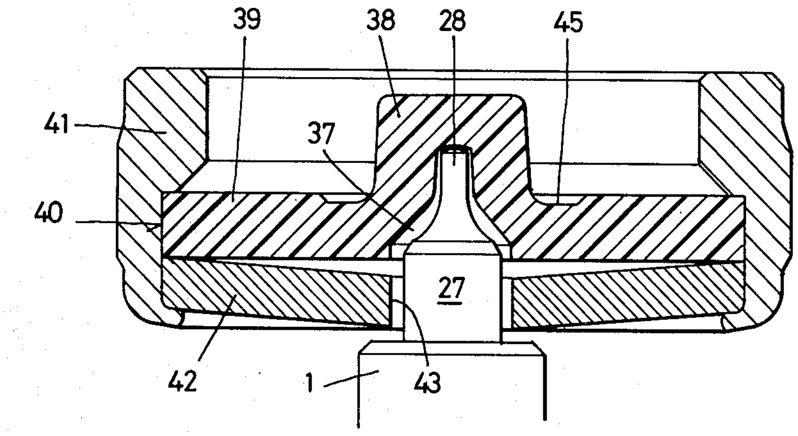
Figure 9:
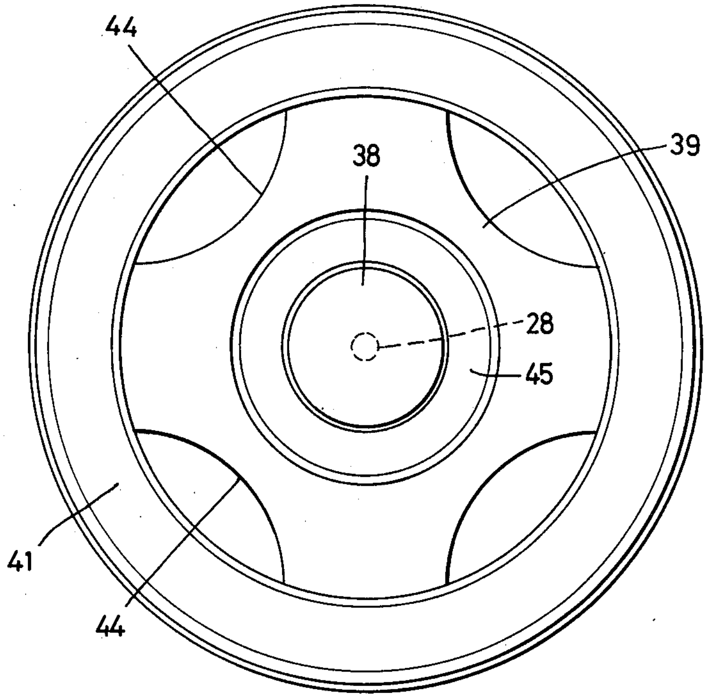
FIG. 9 is a plan view of the bearing of FIG. 8.

The axial and transverse displacements of a usual shaft 1 with a strong section 27 and a cylindrical pivot 28 can also be limited by rigid abutting means as with the embodiments represented in FIGS. 5 and 6 as it is shown by the sixth embodiment (FIGS. 8 and 9). It is then of course no longer necessary that the shape of the central opening 37 of the movable bearing member 38 exactly corresponds to that of the shaft section entering that space of the bearing member.

As with the embodiment of FIG. 6 the movable member 38 and its web 39, which are molded in one piece of plastics, are held in place in an annular recess 40 of member 41 by means of a ring 42 having an opening 43 and being set in member 41. In this sixth embodiment piece (38, 39) has a shape which is easier to mold than piece (22, 23) of FIG. 6. As a compensation, ring 42 is not flat but slightly bulged outwards of body member 41. This shape has the advantage to confer more rigidity to the ring which will thus be able to resist under better conditions to the very strong axial impacts. For the same reason, ring 42 will preferably be made out of a material having a hardness higher than 500 Vickers, for instance out of tempered steel, so as to avoid any damage due to an impact and to prevent pivot 28 from moving out of the substantial cylindrical portion of the corresponding bearing member and risk to detach a chip from the bell-mouthed portion of this bearing member when the pivot returns in place after the impact. Bulging of ring 42 constitutes an easy operation which can be carried out at the same time as ring 42 is cut out. To facilitate molding piece (38, 39) by web 39 thicker without reducing its elasticity and reducing the quality of the suspension of the movable member 38 within the body member 41, cut-outs 44 (FIG. 9) are provided at the periphery of web 39. An annular groove 45 is provided for the same purpose in web 39 around the bearing member 38.

Upon considering the working conditions of the pivot bearings described and in particular of the yielding web ensuring the pivot protection against the impacts, it will be noted that even if that part of the bearing is made out of a synthetic material, it does not risk becoming altered in use because it is not subjected to any permanent mechanical stress.

What I claim is:

1. A shock-absorbing pivot bearing for a rotary watch part, especially the balance wheel, having a shaft ending in a pivot tip, comprising, in combination: a rigid and fixed hollow body member; a flat resilient member substantially perpendicular to the pivot axis of said pivot tip and having a peripheral portion secured to said body member and a circular inner portion normally resting in an unstressed central position within said body member, said inner portion being freely and resiliently yieldable away from said centered position in an axial direction and in a tilting direction about any one of its diameters; a bearing member carried by said resilient member and projecting substantially perpendicularly from the inner portion thereof away from the watch part pivoted in the bearing, said bearing member having an inner surface surrounding a space for receiving said pivot tip and adjacent shaft portion, said inner surface being more splayed than the shaft portion entering the space it surrounds, in order that the frictional engagement between the pivot and its bearing occurs substantially exclusively at a point of the pivot tip and a point of said inner surface of the bearing member remote from said resilient member; and radial abutting means comprising the wall of a circular opening which surrounds and is spaced from said shaft section, a radial impact thus causing the pivot tip and the part of the bearing member remote from the resilient member to move together in a direction substantially perpendicular to the bearing axis, the inner portion of said resilient member tilting about its diameter which is perpendicular to the direction of the impact, said resilient member being bent only until said shaft section engages said radial abutting means.

2. The pivot bearing of claim 1, in which said bearing member and said resilient member are made integrally in one piece.

3. A pivot bearing as claimed in claim 2, in which the piece constituting said bearing and resilient members is made of plastics, the pivot bearing further comprising a metallic ring secured to said body member and having a central opening having a diameter large enough to receive a shaft end portion with free play, said ring serving as said radial abutting means by cooperating with the shaft end for limiting the amplitude of the axial and the transverse displacements thereof under the action of an impact.

4. In the pivot bearing as claimed in claim 2, said resilient member being thinner than the wall of said bearing member.

5. In the pivot bearing as claimed in claim 2, said resilient member being provided with a row of cut-outs regularly staggered around the bearing axis and leaving narrow radial arms between them, an annular continuous central portion and an annular continuous peripheral portion, said radial arms extending from said central to said peripheral portion and connecting them together.

6. In the pivot bearing as claimed in claim 2, the inner surface of said movable member having a conical portion accommodated for receiving a pivot having a conical outer surface.

7. In the pivot bearing as claimed in claim 6, the conical portion of the inner surface of said bearing member being adapted for receiving a conical pivot having an apex angle comprised between 10° and 40°, the apex angle of said conical inner surface being 5° to 20° larger than the apex angle of the pivot side surface.

8. In the pivot bearing as claimed in claim 6, the pivot having a spherical tip surface being tangent to the pivot conical outer side surface, the inner surface of said bearing member having a spherical portion with a diameter slightly larger than the diameter of the spherical tip surface of the pivot, said spherical portion being tangent to the conical portion of said bearing member.

9. The pivot bearing of claim 2, in which said one piece is made of plastics, the pivot bearing further comprising a metallic ring secured to said body member and comprising said radial abutting means and axial abutting means for said shaft.

10. A shock-absorbing pivot bearing for supporting a rotary shaft to which a pivot member is fixed, comprising: a rigid body member; movable pivot support means, including a substantially planar resilient web portion having inner and outer substantially annular rings connected by substantially radial arm portions, and a cap portion connected to said inner annular ring and extending substantially coaxially with the axis of said shaft and having a hollow interior of a shape complementary to that of said pivot member, the dimensions of said hollow interior being larger than the corresponding exterior dimensions of said pivot member, the end portion of said pivot member opposite said shaft normally contacting the innermost end of said hollow interior; said outer annular ring being fixed to an axially extending annular wall of said rigid body member; said inner annular ring and said cap portion being unsupported except by said outer annular ring and radial arm portions in a normally unstressed condition to permit substantially free movement of said cap portion both axially and tiltingly about the point of contact of said cap portion and said pivot member.

* * * * *